May 5, 1964   E. M. HINKLE   3,131,743
BLIND, SELF-LOCKING, FLOATING ANCHOR NUT
Filed July 28, 1961   2 Sheets-Sheet 1

INVENTOR.
EWAN MERRITT HINKLE
BY
Knox & Knox

INVENTOR.
EWAN MERRITT HINKLE
BY
Knox & Knox

United States Patent Office 3,131,743
Patented May 5, 1964

3,131,743
BLIND, SELF-LOCKING, FLOATING ANCHOR NUT
Ewan M. Hinkle, San Diego, Calif., assignor to The Ryan Aeronautical Co., San Diego, Calif.
Filed July 28, 1961, Ser. No. 132,257
1 Claim. (Cl. 151—41.74)

The present invention relates generally to threaded nuts and more particularly to a blind, self-locking, floating anchor nut and is a continuation-in-part of my copending application Serial No. 98,430 of similar title, filed March 27, 1961, and now abandoned.

The primary object of this invention is to provide an anchor nut which can be installed in a blind hole in a plate or sheet structure and which is self-locking when compressed, without the need for special applicators or break away portions.

Another object of this invention is to provide an anchor nut having an integral stop to prevent over-compression and avoid damage to the nut or structure.

A further object of this invention is to provide an anchor nut having a floating nut portion which cooperates with the integral stop to limit compression and bears on the stop when the nut is in use, so relieving the load on the retaining elements of the captive structure.

Still another object of this invention is to provide an anchor nut having retaining flange structure which is particularly adaptable to very small sizes of nuts and may be used with thin material.

Finally, it is an object to provide an anchor nut of the aforementioned character which is simple and convenient to manufacture and use and which will give generally efficient and durable service.

With these and other objects definitely in view, this invention consists in the novel construction, combination and arrangement of elements and portions, as will be hereinafter fully described in the specification, particularly pointed out in the claim, and illustrated in the drawings which form a material part of this disclosure, and in which:

Similar characters of reference indicate similar or identical elements and portions throughout the specification and throughout the views of the drawing.

Figure 1:
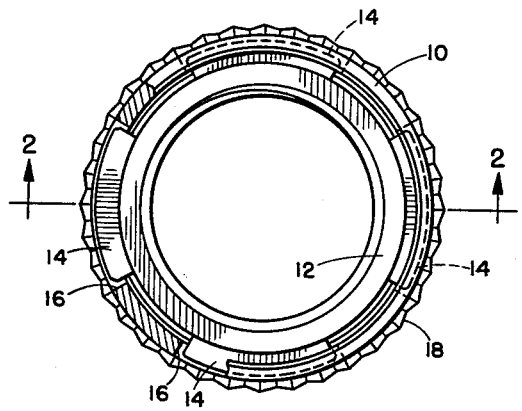
FIGURE 1 is a top plan view of the nut, partially cut away.
Figure 2:
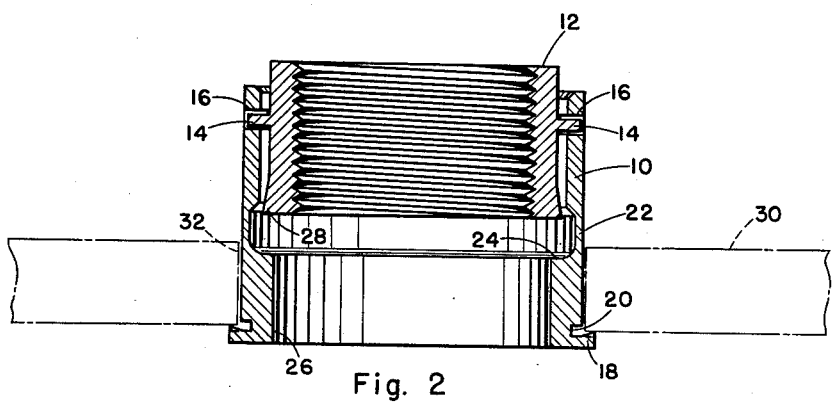
FIGURE 2 is a sectional view taken on the line 2—2 of FIGURE 1.
Figure 3:
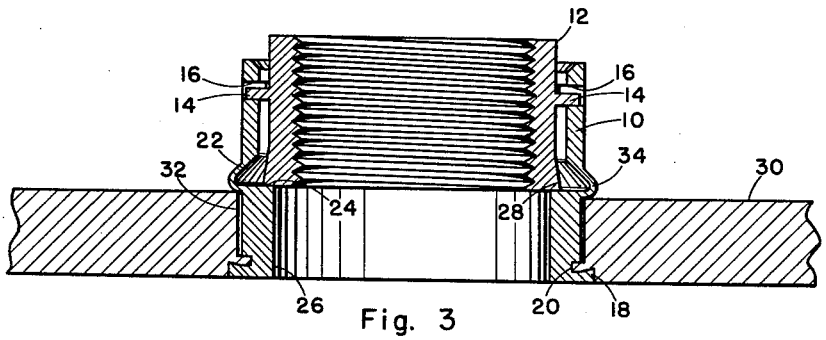
FIGURE 3 is a sectional view similar to FIGURE 2, but showing the nut locked in place in a plate.

Referring to FIGURES 1–3, the nut comprises only two parts, a generally cylindrical body 10 and an internally threaded nut portion 12. The nut portion 12 has a plurality of circumferentially spaced, radially extending lugs 14 which fit through correspondingly positioned slots 16 adjacent one end of the body 10. The slots 16 are somewhat larger than the lugs 14, so that the nut portion 12 is free to float to a certain degree, this arrangement greatly reducing the necessity for precise alignment of the anchor nut in a structural assembly. At the other end of the body 10 is a radially outwardly extending flange 18, serrated on its outer periphery and inner face, while immediately adjacent the flange, the body has an annular, undercut groove 20.

Inside the body 10, adjacent the inner end of the nut portion 12, the wall is undercut to provide a thin wall portion 22. The end of the thin wall portion remote from the nut portion 12 curves smoothly into an inwardly projecting annular stop shoulder 24, leaving a reduced diameter end bore 26 substantially smaller than the nut portion, which has a slightly flared end 28 adjacent said shoulder.

The nut can be installed in a sheet of material, structural assembly or the like, as typified by the plate 30 indicated in broken line in FIGURE 2 and in section in FIGURE 3. The only access required in the plate 30 is a single clearance hole 32 to admit the body 10, but smaller in diameter than the flange 18. The nut can be made in various lengths to suit different material thicknesses, it being necessary that the axial length of the nut from the flanged end to the stop shoulder 24 being substantially equal to the thickness of material in which the nut is installed.

All that is required to anchor the nut is an axial compression and this can be applied by a threaded mandrel through the nut portion 12. The mandrel, not shown, can be hand tightened or used in a power tool, with a torque limiting attachment if necessary. When the body 10 is axially compressed, the thin wall portion 22 collapses outwardly and forms an annular swaged rib 34 which bears against one face of the plate 30. The smoothly curved junction of the thin wall portion with the stop shoulder insures proper outward collapse of the wall. The compression also pulls the serrated flange 18 into the other face of the plate 30, it being necessary that the nut is made from harder material than the structure itself to insure proper seating. As the flange 18 bites into the plate, the material of the plate is displaced into the groove 20 to lock the nut in place. Compression continues until the nut portion 12 seats against the stop shoulder 24, at which time the nut is completely seated and firmly anchored, as in FIGURE 3.

Figure 4:
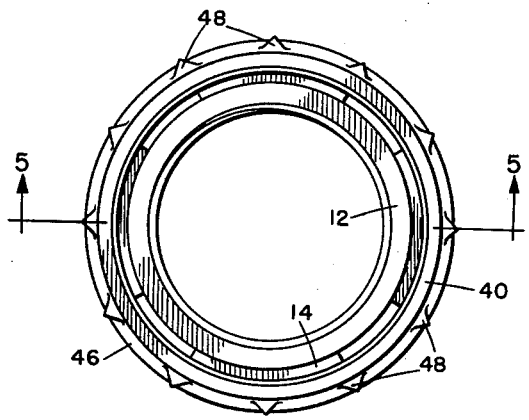
FIGURE 4 is a top plan view of a modified form of the nut.
Figure 5:
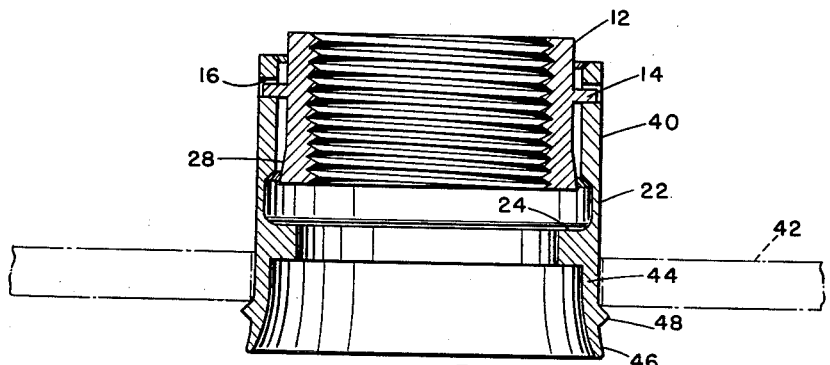
FIGURE 5 is a sectional view taken on the line 5—5 of FIGURE 4.
Figure 6:
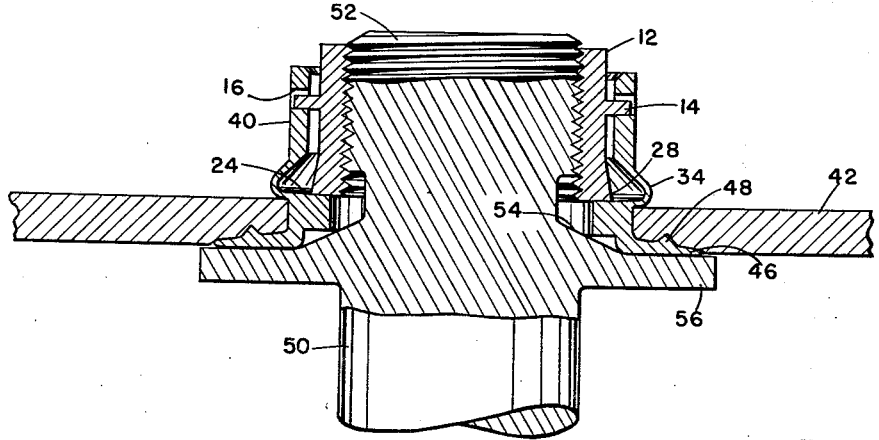
FIGURE 6 is a sectional view similar to FIGURE 5, but showing the nut secured in a sheet of material.

In very small nut sizes it may be impractical to provide a serrated flange of sufficient rigidity to upset the material of the supporting structure, as in FIGURE 3. The modified anchor nut illustrated in FIGURES 4–6 is suitable for very small sizes and can be attached to thin sheet material. In this particular anchor nut, the body 40 is basically similar to that described above, having a stop shoulder 24, thin wall portion 22 and slots 16 to receive the lugs 14 of a nut portion 12, also as previously described. The modification is in the end of the body portion which extends through the supporting structure, typified by the sheet or panel 42 in FIGURES 5 and 6, the modification comprising a reduced thickness end portion 44 having a slightly outwardly flared skirt 46. Spaced around the outside of skirt 46 are small prongs 48 of conical or pyramidal form.

The modified nut is installed generally as previously described but requires the use of a special mandrel 50, as in FIGURE 6, the mandrel being turned manually or by power operated means. The mandrel 50 has a threaded portion 52 which is screwed into the nut portion 12, the body 40 being inserted through a clearance hole in the panel 42 until stopped by the prongs 48. The mandrel is provided with a conical flared portion 54 having a radially extended setting flange 56 which, when tightened against the anchor nut, forces the skirt 46 outwardly and presses the skirt flat against the panel 42 with the prongs 48 embedded therein to prevent rotation. As before, the compression of the anchor nut is limited by the nut portion 12 bearing on the stop shoulder 24 after the thin portion 22 has been swaged outwardly. The design of the mandrel is not critical and may be varied to suit particular applications.

The nut is thus self-locking by its own structure and is easily applied in blind holes, or in virtually any location in structural assemblies. In use, the nut portion bears directly on the stop shoulder and prevents any strain on the nut retaining lugs. The locking action of the nut is positive and there is no tendency for the nut to work loose due to vibration or repeated use, as is the case with conventional rivetted anchor nuts.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

An anchor nut, comprising:
a tubular body having an outwardly extending flange at one end;
a plurality of circumferentially spaced slots in the other end of said body;
a tubular nut having outwardly projecting lugs adjacent one end thereof loosely engaged in said slots and retaining said nut;
said nut having a portion thereof disposed within said body and extending from said lugs toward said one end of said body;
said portion of said nut terminating in a flared end;
said body being internally undercut and having a thin wall portion intermediate the ends;
said flared end of said nut lying within said undercut;
an integral internal stop shoulder in said body having a smoothly curved junction with said thin wall portion at the end remote from said nut, whereby axial compression of the body causes outward collapse of said thin wall portion until said flared end of said nut seats against said stop shoulder.

References Cited in the file of this patent

UNITED STATES PATENTS

| | | |
|---|---|---|
| 2,401,427 | Kimbell | June 4, 1946 |
| 2,409,352 | Gill | Oct. 15, 1946 |
| 2,553,236 | Bratfisch | May 15, 1951 |
| 2,832,254 | Viger et al. | Apr. 29, 1958 |
| 3,013,643 | Perry | Dec. 19, 1961 |

FOREIGN PATENTS

| | | |
|---|---|---|
| 536,553 | Great Britain | May 19, 1941 |
| 637,413 | Great Britain | May 17, 1950 |
| 819,406 | Great Britain | Sept. 2, 1959 |
| 510,011 | Canada | Feb. 8, 1955 |